Aug. 26, 1924.
D. F. DOMIZI
1,506,365
REAR AXLE CONSTRUCTION
Filed Nov. 27, 1922
2 Sheets-Sheet 1
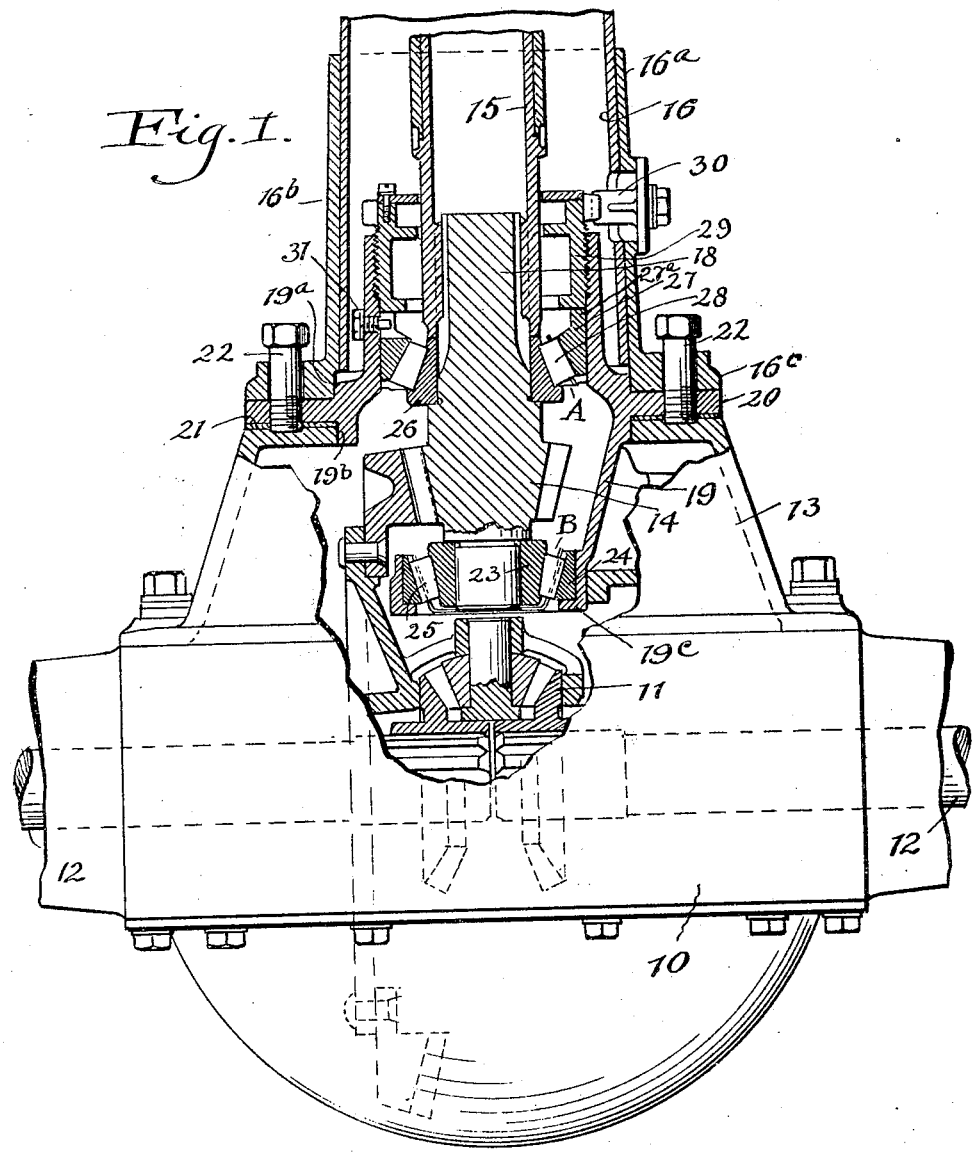
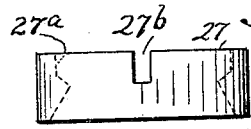
Inventor
David F. Domizi
by
Thurston Kwis & Hudson
attys.

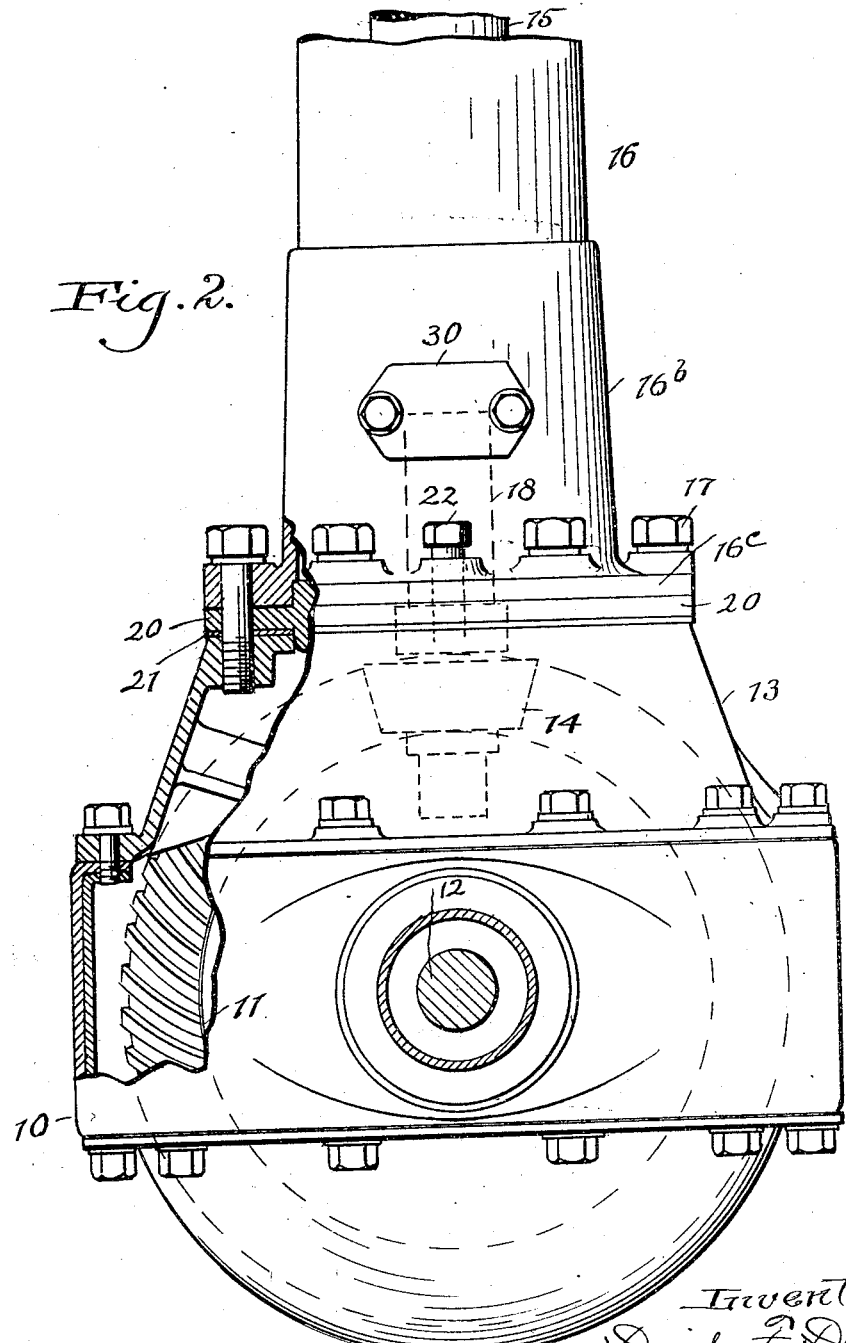

Patented Aug. 26, 1924.

1,506,365

UNITED STATES PATENT OFFICE.

DAVID F. DOMIZI, OF CLEVELAND, OHIO.

REAR-AXLE CONSTRUCTION.

Application filed November 27, 1922. Serial No. 603,491.

*To all whom it may concern:*

Be it known that I, DAVID F. DOMIZI, a citizen of the United States, residing at Cleveland, in the county of Cuyahoga and State of Ohio, have invented a certain new and useful Improvement in Rear-Axle Constructions, of which the following is a full, clear, and exact description.

This invention relates to rear axle constructions, and has for one of its objects to provide certain improvements in the support for the driving pinion. More specifically considered, the invention aims to provide two bearings for the pinion with provision for adjusting one with respect to the other without the possibility of a mis-alignment.

A further object is to provide certain improvements which permit the quick and ready dis-assembly of the housing, the rear end of the torque tube and the bearing retainer.

The invention may be briefly summarized as consisting in certain novel details of construction, and combinations and arrangements of parts which will be described in the specification and pointed out in the appended claims.

In the accompanying sheets of drawings wherein I have shown an embodiment of the invention which operates with high efficiency, Fig. 1 is a plan view of a portion of the rear axle assembly and drive for the differential mechanism, the same formed and arranged in accordance with my invention, parts being in section; Fig. 2 is a vertical sectional view with parts in side elevation; and Fig. 3 is a detached detail view showing an improved bearing ring employed by me.

Referring now to the drawings, 10 represents the differential housing and 11 the differential mechanism, the details of which are immaterial to my invention and through which the live axles indicated at 12 are driven.

As is usually the case, the differential housing 10 has a forward extension 13 which encloses a driving pinion 14 which is rotated by the propeller shaft 15, the shaft 15 being surrounded in this instance by a torque tube 16 which at its rear end is provided with a tight fitting sleeve 16$^b$ having a flange 16$^c$ secured to the housing extension 13 by an annular series of bolts 17.

The pinion 14 has a stub shaft 18 which fits into and is splined to the propeller shaft 15, here shown as being in the form of a tube, but I prefer that the pinon and its stub shaft be not fixed in position but free to slide in and out in the same manner that the forward end of the propeller shaft has a free sliding movement with one element of the universal joint. That is to say, the forward end of the propeller shaft is usually capable of endwise movement relative to the universal joint, and as far as I am aware the driving pinion has always been fixed to the rear end of the propeller shaft, but I prefer that it also have a sliding or floating connection with the shaft.

It will be observed that the pinion 14 is supported by two bearings A and B arranged on opposite sides thereof, each bearing being in this instance a combined thrust and radial bearing of the roller type. While these bearings, particularly the bearing A involve important features of my invention, the precise type of bearings herein illustrated is not essential to the invention.

The two bearings are in this instance supported in a retainer 19 having an outstanding radial flange 20 which is clamped between the housing extension 13 and the end of the torque tube, a shim 21 being generally provided between the flange 20 and the housing extension 13. It will be observed also, that the retainer has a shoulder 19$^a$ which fits inside the torque tube sleeve 16$^a$ and a second annular shoulder 19$^b$ which fits inside the end of the housing extension 13. It is intended that these parts have a tight fit, and that they be accurately machined for that purpose. One important feature of my invention resides in the means for readily dis-assembling these parts, and this is accomplished by providing a pair of special bolts 22 which are diametrically opposite each other and are in the same annular series as the bolts 17, but have no function in so far as fastening together the end of the torque tube, the retainer 19 and the housing extension 13. These two bolts 22 are threaded in the flange 20 of the retainer and bear against the end of the housing extension 13, preferably in slight recesses provided for that purpose, and they pass freely through the flange of the torque tube.

Ordinarily it would be necessary in order to disassemble the parts, to wedge them apart with a screw-driver or special tool, as, for example, when it becomes necessary to separate the parts to vary the thickness of the shim 21. However, it is obvious that if these bolts 22 are screwed inward they will force the shoulder 19$^b$ of the retainer out from the end of the housing extension 13, and if after this is done the heads of the bolts are tapped with a hammer the shoulder 19$^a$ of the retainer will be forced out from the end of the torque tube. In this manner though the parts are machined to fit tightly together they can be very readily dis-assembled.

Referring now to the bearings A and B, which as before mentioned, constitute important features of my invention, it will be observed that each of these bearings includes inner and outer rings with rolling anti-friction bearing members between them, the latter consisting in this instance, though not necessarily, of slightly tapered rollers which may be associated with any suitable form of retainer. The lower or rearward bearing B has an inner ring 23 fitted on the rear or outer end of the pinion. The outer ring 24 is tightly fitted into a cup 19$^c$ on the end of the retainer, and between the rings are the roller bearings 25. The bearing A which is on the opposite side of the pinion from the bearing B has an inner ring 26 fitted onto the stub shaft 18$^b$, an outer ring 27 and intermediate rollers 28, the outer ring 27 being fitted in the cylindrical body portion of the retainer 19.

For the purpose of adjusting the bearing A so as to take up all end play, an adjusting nut 29 is screwed into the forward end of the retainer, the nut being normally held from turning by any suitable means such as by a locking device 30 carried by the torque tube.

It is commonly the case that the outer ring of the bearing corresponding to my bearing A is capable of turning either in service or while the nut 29 is turning to adjust the bearing. In fact, the outer ring 27 is commonly seated in a cup formed in the end of the nut so as to turn with the nut.

However, the turning of the ring 27 either under service conditions or during adjustment has the disadvantage that it disturbs proper bearing alignment, for, though perfect alignment may be obtained with the rings 24 and 27 in certain position, any slight eccentricity of one or both of the rings will destroy the alignment if either of the rings is turned from that position.

In accordance with my invention the ring 27 though capable of endwise or axial movement when the nut 29 is adjusted, is held from turning while this adjustment is made as well as during service. To accomplish this result a suitable interfitting or interlocking arrangement between the ring 27 and the retainer is provided, which will permit the ring to be moved endwise toward the pinion by the adjustment of the nut 29, but will prevent the ring turning and will serve to hold it at all times in the same angular position in which it was originally placed.

To obtain these results without weakening the ring mechanically, and without providing parts which are difficult to machine, the ring is provided beyond the race-way part engaged by the rollers 28, with a sleeve-like extension 27$^a$ against the end of which the adjacent end of the nut 29 bears, and in this sleeve-like extension I provide an axially disposed slot 27$^b$ into which extends a part which is carried by the retainer which holds the ring against rotation, this part being in this instance in the form of a screw 31. Obviously with this construction when the nut 29 is screwed in, the ring 27 and therefore the entire bearing A is moved toward the pinion, but the end of the screw 31 engaging in the slot 27$^b$ holds the ring against rotation, the slot 27$^b$ being of ample length to provide for the greatest possible adjustment of the bearing. Therefore, assuming that the ring 24 does not rotate and no difficulty is encountered in preventing its rotation due to the tight fit which it has in the holding cup of the retainer, the two outer rings 24 and 27 will therefore always maintain the same angular position, and the original condition of perfect alignment is not disturbed.

By providing a non-rotating bearing ring 27 for the bearing A as well as for the bearing B, the retainer 19 can be machined so as to obtain perfect alignment on the assembling of the parts of the axle. To accomplish this, the walls or surfaces of the retainer engaged by the rings 24 and 27 are machined from the same setting or from the same axis. Then the rings 24 and 27 are placed in the retainer in the angular positions which they will permanently occupy in the rear axle assembly. Then the retainer is placed on an arbor shaped so that it is supported on the inner surfaces of the bearing rings 24 and 27, and while supported on this arbor, which in turn is supported on the rings 24 and 27, the opposite faces of the supporting flange 20 of the retainer are machined off so as to lie in planes which are precisely at right angles to the axis of the arbor. In consequence when the pinion is supported in the retainer its axis will correspond to the axis of the arbor on which the flanges of the retainer were faced off, the angular position of the rings 24 and 27 while supporting the pinion being the same as while supporting the arbor. By this means proper alignment of the bearings is obtained, but as before stated, in order that the alignment may be maintained, it is important that the ring 27 always occupy the same angular position, and this is accomplished by my invention.

I do not desire to be confined to the exact details shown, but aim in my claims to cover all modifications which do not involve a departure from the spirit and scope of my invention in its broadest aspects. For example, as far as the improvements in the pinion bearings are concerned, the invention is not confined to a construction requiring a torque tube such as applicant's tube 16.

Having described my invention, I claim:

1. In a rear axle, the combination with a differential, of a driving pinion, a pair of roller bearings on opposite sides of the pinion for supporting it, a supporting member in which one of the bearings is mounted, said bearing being adjustable axially of the pinion and having an outer ring capable of axial movement but interlocked with said member against rotative movement.

2. In a rear axle, the combination with a differential, of a driving pinion, a pair of roller bearings on opposite sides of the pinion for supporting it, a supporting member in which one of the bearings is mounted, said bearing being adjustable axially of the pinion and having an outer ring mounted in said member for axial movement therein but interlocked with said member against rotative movement, and means engaging said ring to move the bearing axially.

3. In a rear axle, a differential, a driving pinion, a pair of roller bearings on opposite sides of the pinion for supporting it, a bearing retainer supporting said bearings, one of said bearings being axially movable in the retainer and including an outer ring interlocked with said retainer so that it is movable axially of the retainer but is held against rotative movement.

4. In a rear axle, a differential, a driving pinion, a pair of roller bearings on opposite sides of the pinion for supporting it, a bearing retainer supporting said bearings, one of said bearings being axially movable in the retainer and including an outer ring interlocked with said retainer so that it is movable axially of the retainer but held against rotative movement, and a nut engaging the retainer and said outer ring for adjusting said adjustable bearing.

5. In a rear axle construction, a differential, a driving pinion, a roller bearing for supporting the pinion, a member supporting said bearing and carrying an adjusting nut, the nut and the outer ring of said bearing being movable axially of said member, but said ring being interlocked with said member so as to be held against rotative movement.

6. In a rear axle, a differential, a driving pinion, a roller bearing supporting the pinion and comprising inner and outer rings and intermediate rolling members, a retainer for said bearing, the outer ring of the bearing having at one end an extension with a slot, and a member extending from the retainer into the slot to hold the ring against rotative movement.

7. In a rear axle, a differential, a driving pinion, a roller bearing for supporting the pinion, a retainer carrying said bearing, said bearing comprising an outer ring having a slot, a part projecting from the retainer into the slot to hold the ring from rotation, and means for moving said ring axially of the retainer to adjust said bearing.

8. In a rear axle, a differential, a driving pinion, a roller bearing for supporting the pinion, a retainer carrying said bearing, said bearing comprising an outer ring having at one end an extension with a slot, a part extending from the retainer into the slot to hold the ring against rotation, and an adjusting member carried by the retainer and engaging the end of said extension to adjust the bearing axially.

9. In a rear axle construction, a differential, a differential housing having a forward extension, a driving pinion having supporting bearings, a retainer carrying said bearings having a part interfitting with the housing extension and having an outstanding flange engaging the end of the extension, means passing through the flange and through the end of the extension to secure said parts together, and means passing through said flange and engaging the end of the extension to force the interfitting parts of the retainer and extension apart for disassembling purposes.

10. In a rear axle construction, a differential, a differential housing having a forward extension, a driving pinion, bearings therefor, a propeller shaft, a torque tube surrounding the propeller shaft and having a flanged end, a retainer for the bearings having an outstanding flange, means for securing together the flange of the torque tube, the flange of the retainer and the end of the housing extension, the retainer having portions interfitting with portions of the housing extension and torque tube, and means for dis-assembling the interfitting parts comprising a screw having a threaded engagement with the flange of the retainer, said screw passing freely through the flange of the torque tube and adapted to abut against the end of the housing extension.

In testimony whereof I hereunto affix my signature.

DAVID F. DOMIZI.